Figure 9:
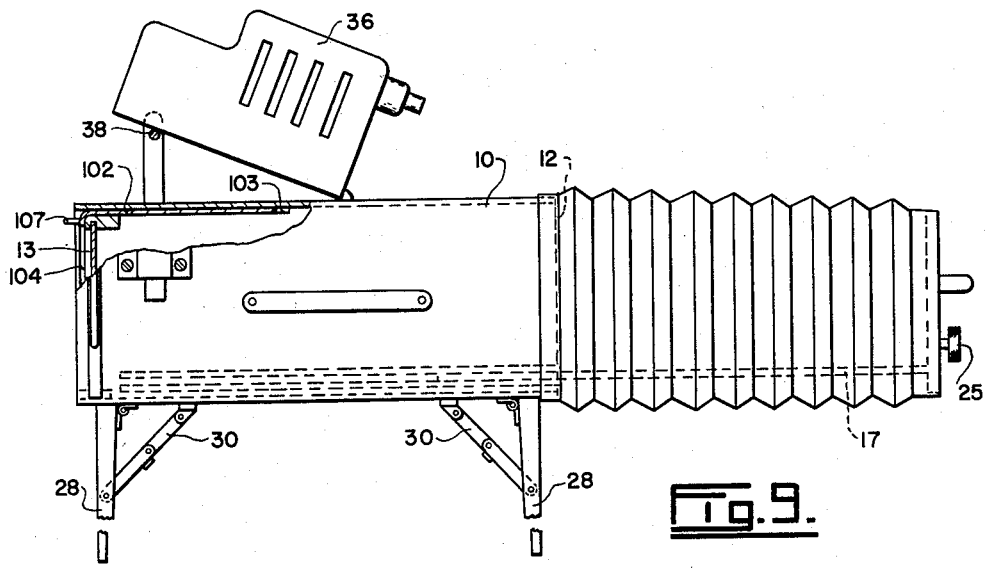

March 8, 1955  D. W. BROWN ET AL  2,703,507
PICTURE PROJECTOR STAND
Filed Nov. 4, 1953  3 Sheets-Sheet 1
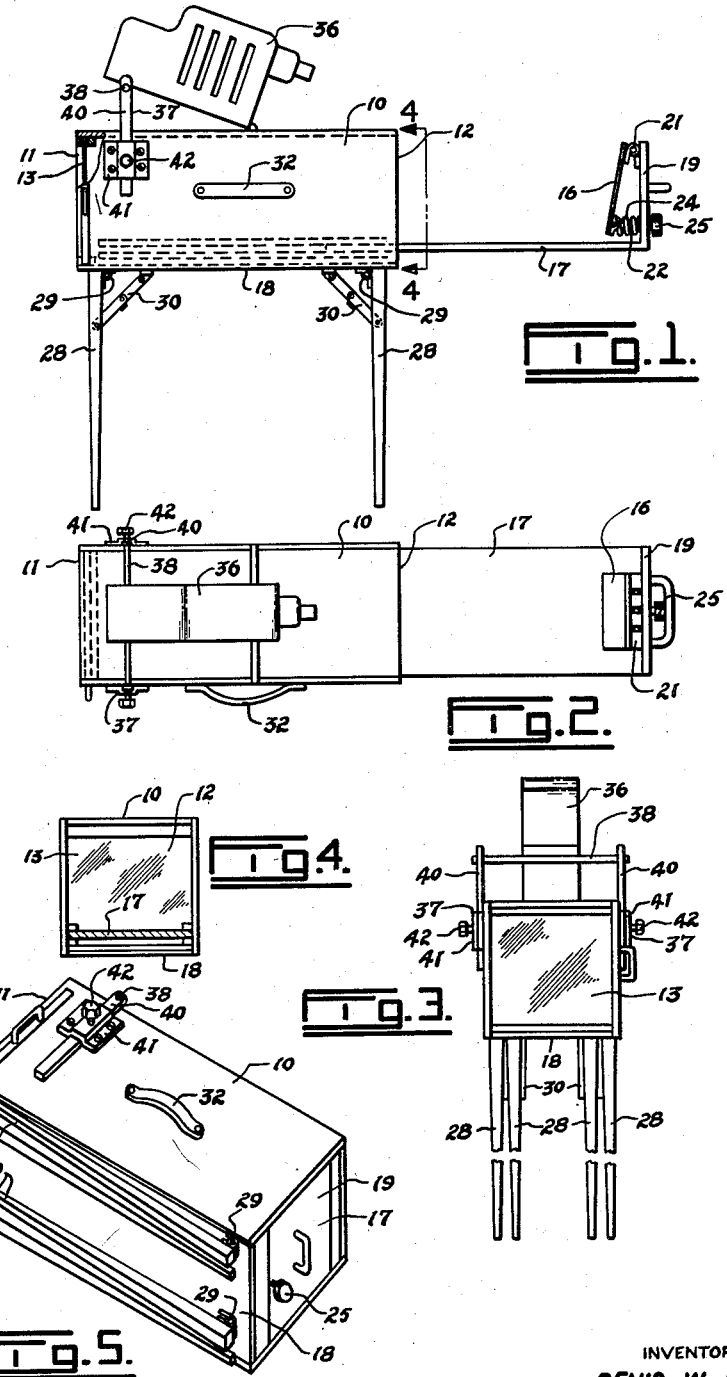
INVENTORS
DENIS W. BROWN
ROBERT H. SMITH
BY
Fetherstonhaugh & Co.
ATTORNEYS

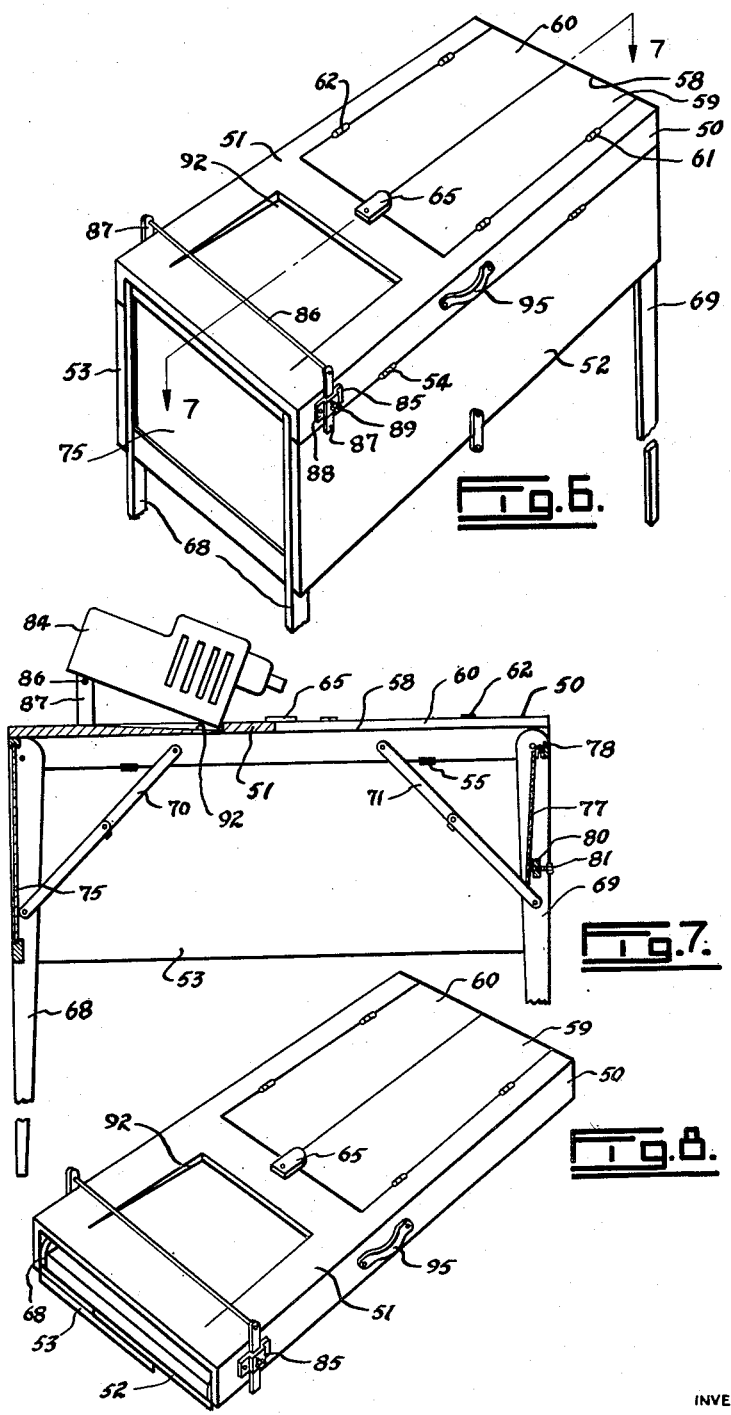

March 8, 1955  D. W. BROWN ET AL  2,703,507
PICTURE PROJECTOR STAND
Filed Nov. 4, 1953  3 Sheets-Sheet 3

INVENTORS
DENIS W. BROWN
ROBERT H. SMITH
BY
Fetherstonhaugh & Co.
ATTORNEYS

United States Patent Office 2,703,507
Patented Mar. 8, 1955

2,703,507

PICTURE PROJECTOR STAND

Denis W. Brown and Robert H. Smith, Victoria, British Columbia, Canada

Application November 4, 1953, Serial No. 390,140

9 Claims. (Cl. 88—24)

This invention relates to a picture projector stand which may be used with projectors for motion pictures, film strips and/or slides.

This application is a continuation in part of applicants' application Serial Number 182,872, filed September 1, 1950, now abandoned, as to subject matter common thereto.

An object of the present invention is the provision of a picture projector stand which may be used with any type of projector.

Another object is the provision of apparatus which will enable projected pictures to be viewed in daylight or in artificial light.

Yet another object is the provision of a picture projector stand by means of which projected picture images may be satisfactorily viewed in any lighting conditions.

A further object is the provision of apparatus for eliminating the necessity of having a darkened room in order to see projected pictures, therefore making it possible to use the apparatus in any room without any special equipment.

A still further object is the provision of a picture projecting apparatus which may be packed into a complete and compact unit, and which is light and may be easily carried from place to place.

Yet another object is the provision of picture projecting apparatus which is complete in itself, thus eliminating the necessity for any additional screen, stand or blackout equipment.

It is well-known that teaching by means of pictures is ideal, but up to the present time the use of this type of teaching has been restricted in view of the fact that the picture projecting apparatus had to be set up in a completely darkened room. This is not possible in the day time unless the room is specially prepared for it. This means that a class has to be moved from its regular room to a darkened projecting room. Thus, a special dark room is necessary and only one group at a time may use it, which is very limiting in a school with a large number of classes.

The present invention eliminates these difficulties by providing apparatus which is complete in itself for projecting pictures. The apparatus, including the projector may be folded into a very compact unit to be carried from place to place. This apparatus is designed to project pictures which may be seen under any lighting conditions. The apparatus includes its own screen and a stand for the projector. Furthermore, the apparatus may be set up at the front of a group, such as a class, where it may be operated by an instructor and the pictures readily be seen by all in the group.

This picture projector stand comprises an elongated cabinet which is open at its opposite ends, a translucent screen covers one end, and suitable means is provided at the opposite end for retaining a reflector in line with the latter end. The cabinet is provided with a plurality of legs hingedly secured to the bottom thereof, and with means on its top for holding a picture projector directed towards the reflector. The projector may be a motion picture or a slide projector. It is preferable, although not absolutely necessary, to mount the reflector on a drawer which slides out of and into the cabinet. When not in use, the projector may be placed in the drawer and moved into the cabinet and the legs folded up against the cabinet bottom.

Figure 10:
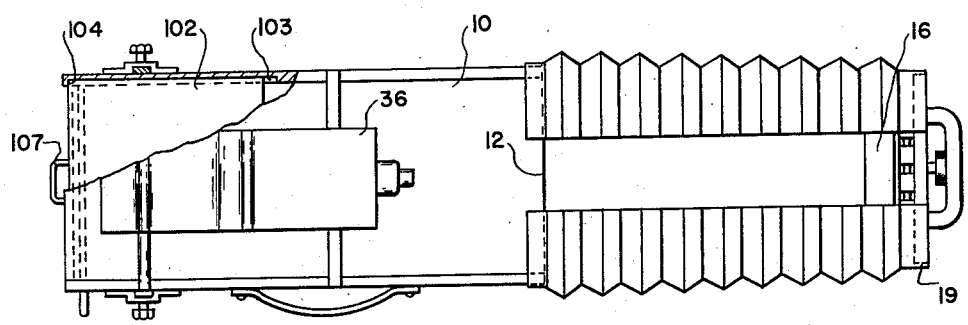
Figure 11:
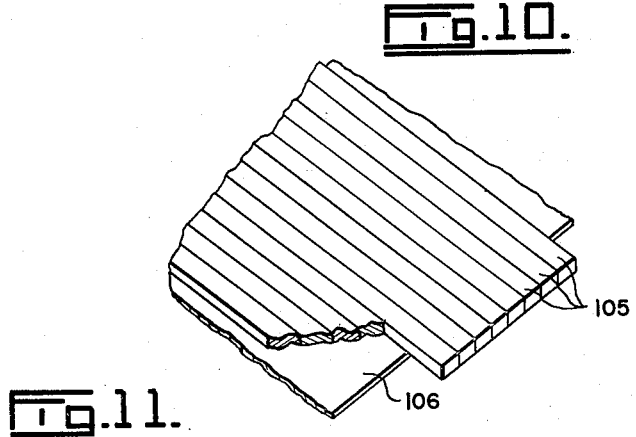

An example of this invention is illustrated in the accompanying drawings, in which, Figure 1 is a side elevation of the picture projector stand in operation, Figure 2 is a plan view of the stand, Figure 3 is an end elevation of the stand looking at the screen thereof, Figure 4 is a section taken on the line 4—4 of Figure 1, Figure 5 is a perspective view of a stand folded and ready to be carried, looking at the end thereof remote from the screen, Figure 6 is a perspective view of an alternative form of the invention with the projector removed, Figure 7 is a longitudinal section through the alternative form of the device, Figure 8 is a perspective view of the device of Figures 6 and 7 folded and ready to be carried, Figure 9 is a view similar to that of Figure 1 but showing an arrangement for shading the reflector from external sources of light, and showing an arrangement for protecting the screen, Figure 10 is a top plan view of the arrangement shown in Figure 9, and Figure 11 is an enlarged partial view of the screen projector.

Referring to the drawings, 10 is a cabinet which is preferably elongated and rectangular in shape. This cabinet is open at its ends 11 and 12. A translucent screen 13 removably covers the open end 11. This screen is preferably formed of very thin material which will not distort pictures projected on one side thereof so that they may clearly be seen on its opposite side.

A reflector 16 is provided, and this reflector is preferably a very thin mirror, although it may be a highly polished piece of metal. This reflector is to be retained in line with the open end 12 of the cabinet. One very convenient and useful way of doing this is to provide a drawer 17 slidably mounted in the cabinet above the bottom 18 thereof. This drawer may be slid into and out of the cabinet, and it has an outer end wall 19 which closes the cabinet end 12 when the drawer is closed. The mirror 16 is hingedly mounted at 21 on the inner surface of the drawer wall 19. A threaded screw 22 is pivotally connected to the reflector adjacent its lower edge and extends through the end wall 19. A spring 24 is fitted on the screw and lies between the reflector and the drawer wall, while a thumb screw 25 is threaded on the outer end of said screw.

A plurality of legs 28 are hingedly mounted at their upper ends at 29 on the bottom of the cabinet. These legs may be folded against said bottom, and they may be retained in their open positions by collapsible brackets 30 of well-known construction. A handle 32 is attached to one side of the cabinet by means of which the latter may be conveniently carried.

Suitable means may be provided on top of the cabinet for holding a projector 36 of any desired type. This means may be a stand 37 consisting of a transverse rod 38 supported at its opposite ends by arms 40 which, in turn, are slidably mounted in sleeves 41 secured to the sides of the cabinet. A set screw 42 may be provided in each sleeve for retaining the arm in said sleeve in any vertically adjusted position. One end of the projector rests on the cabinet top, while the other end is supported by the stand 37.

In use, the projector 36 is positioned on top of the cabinet 10, as clearly shown in Figure 1. The angle of the reflector 16 is set so that pictures from the projector are directed through the cabinet on to the inner surface of the screen 13. It has been found that pictures projected by this apparatus are clearly discernible from outside the cabinet regardless of the lighting conditions in the room in which the apparatus is set up. These pictures may be clearly seen in broad daylight without any attempt being made to shield the screen from the light. When it is desired to move the apparatus, the projector may be placed in the drawer 17 and when the latter is closed, the projector is moved into the cabinet 10. When the legs 28 are folded up against the bottom of the cabinet, as shown in Figure 5, the apparatus may be conveniently carried by means of the handle 32.

Figures 6 to 8 show an alternative form of the invention in which the cabinet itself is collapsible. In this form of the invention, a rectangular frame 50 has a top 51 covering one side thereof. The opposite side of this frame is covered by flaps 52 and 53 which are connected to the frame by hinges 54 and 55, respectively. These flaps may be held in a closed position in any convenient manner. The cover 51 is formed with a relatively large opening 58 adjacent one end thereof which may be closed by flaps 59 and 60 hingedly connected to the frame by hinges 61 and 62, respectively. These flaps may be retained in their closed position in any suitable manner, such as by means of a latch 65 pivotally mounted on the cover and adapted to be moved over the flaps. Legs 68 are hingedly connected at their upper ends to the frame at the opposite end thereof. Collapsible brackets 70 and 71 are provided for retaining the legs in their open positions.

A translucent screen 75 is carried by the legs 68 at the upper ends thereof, while a reflector 77 is pivotally connected at 78 to the legs 69 at their upper ends. A brace 80 may extend between the legs 69 behind the reflector, and a set screw 81 may be provided in the brace for adjusting the angle of the reflector.

Suitable means may be provided on the top 51 for holding a projector 84 of any desired type. This means may be a stand 85 consisting of a transverse rod 86 supported at its opposite ends by arms 87 which are slidably mounted in sleeves 88 on the outer surfaces of the frame 50. A setscrew 89 may be provided in each sleeve for retaining the arm therein in any vertically adjusted position. One end of the projector rests on the cover, while the other end is supported by the stand 85. If desired, a slight depression 92 may be formed in the cover to act as a stop for the front end of the projector.

The frame 50 may be provided with a handle 95 on one side thereof.

When this device is ready to be used, the frame 50, the cover 51, and the flaps 52 and 53 form a cabinet which is open at its opposite ends. When the legs 68 and 69 are supporting the cabinet, the screen 75 and the reflector 77 close the opposite ends thereof. When the projector 84 is in position, the flaps 59 and 60 are open so that pictures may be projected through the opening 58 on to the reflector 77 whence they are directed to the translucent screen. The angle of the projector may be adjusted by moving the stand 85 up or down, and the angle of the reflector 77 may be changed by means of the setscrew 81.

When the stand is not required, the flaps 59 and 60 are closed, the legs 68 and 69 are folded into the frame 40, and the flaps 52 and 53 are folded into their closed positions. This forms the neat and compact unit shown in Figure 8.

The stand is very light so that the total weight of the apparatus is such that there is no difficulty in carrying it from place to place. Thus, the stand includes its own legs, and its own viewing screen. As a result of this, the apparatus is particularly useful in schools since it may easily be transported from one room to another and put into use without darkening any of the rooms.

The additional features shown in Figures 9 to 11 do not alter the general arrangement hereinabove disclosed with respect to Figures 1 to 8 inclusive as is illustrated by the use of the same reference characters.

One end of an accordion-type bellows 100 is mounted on the otherwise open end 12 of the cabinet. Except for a slot 101 cut longitudinally through the bellows 100 to permit light to pass from the projector 36 to the mirror 16. With the above exception the bellows 100 completely encloses the drawer 17 to shade the mirror 16 from extraneous external sources of light. It will be understood that when the direct rays of the sun, for example, enter the cabinet 10, the reception and clarity of the projected image would suffer considerably. Consequently the use of the bellows has been found desirable under certain conditions. The other end of the bellows 100 is mounted on the drawer wall 19. With the bellows 100 mounted as above, there is very little interference with the normal operation of the drawer 17. The drawer 17 may be closed as before except that the thickness of material of the bellows will prevent the drawer from being as fully closed as is illustrated in Figure 5. It will be understood that the mirror 16 may be supported by other framework besides that of the drawer 17. For example, a pair of pantographic arms may be used which will also enable the mirror 16 to be collapsible towards the cabinet 10.

The forward end of the cabinet 10 shown in Figures 9 and 10 is provided with a shield 102 to protect the screen from being broken as the result of a knock thereagainst. In Figures 9 and 10, the shield is shown in its raised position; that is, pushed back under the top of the cabinet 10. A longitudinal groove 103 and a transverse groove 104 is formed in each side wall of the cabinet to form tracks in which the shield 102 may run. The shield is preferably formed of a plurality of parallel strips 105 (see Figure 11) fixed, as by gluing, for example, to a flexible backing material 106. The strips are preferably of a rigid material such as wood and their ends are adapted to run in the grooves 103 and 104. A handle 107 is provided at the end of the shield so that the latter may be easily raised or lowered.

What we claim as our invention is:

1. A picture projector stand comprising an elongated cabinet open at its opposite ends, a translucent screen covering one end, a drawer slidably mounted in the uncovered end of the cabinet, said drawer closing the said end when the former is closed, a reflector mounted in the drawer in line with and facing the uncovered end of the cabinet when the drawer is open, and a stand mounted on the cabinet for holding a picture projector directed towards the reflector, whereby pictures from the projector are directed by the reflector through the cabinet on to the screen, said pictures being clearly distinguishable from outside the cabinet without the necessity of darkening the room in which the stand is located.

2. A picture projector stand comprising an elongated cabinet open at its opposite ends, a translucent screen covering one end, a drawer slidably mounted in the uncovered end of the cabinet, said drawer closing the said end when the former is closed, a reflector mounted in the drawer in line with and facing the uncovered end of the cabinet when the drawer is open, said reflector being positioned at an angle to the vertical, means for adjusting the angle of the reflector, and a stand mounted on the cabinet for holding a picture projector directed towards the reflector, whereby pictures from the projector are directed by the reflector through the cabinet on to the screen, said pictures being clearly distinguishable from outside the cabinet without the necessity of darkening the room in which the stand is located.

3. A picture projector stand comprising an elongated cabinet open at its opposite ends, a translucent screen at one end of the cabinet, a plurality of legs hingedly mounted on the bottom of the cabinet, said legs being foldable against the cabinet bottom, a drawer slidably mounted in the uncovered end of the cabinet, said drawer having an end wall which closes the cabinet end when the drawer is closed, a reflector mounted on the end wall within the drawer in line with and facing the cabinet when the drawer is open, and means for holding a picture projector directed towards the reflector, whereby pictures from the projector are directed by the reflector through the cabinet on to the screen, said pictures being clearly distinguishable from outside the cabinet without the necessity of darkening the room in which the stand is located.

4. A picture projector stand comprising an elongated cabinet open at its opposite ends, a translucent screen covering one end, a track on each side of said cabinet extending vertically in front of said screen, a shield in said tracks arranged to be raised or lowered, a drawer slidably mounted in the uncovered end of the cabinet, said drawer closing the said end when the former is closed, a reflector mounted in the drawer in line with and facing the uncovered end of the cabinet when the drawer is open, and a stand mounted on the cabinet for holding a picture projector directed towards the reflector, whereby pictures from the projector are directed by the reflector through the cabinet on to the screen, said pictures being clearly distinguishable from outside the cabinet without the necessity of darkening the room in which the stand is located.

5. A picture projector stand comprising an elongated cabinet open at its opposite ends, a translucent screen covering one end, a track on each side of said cabinet extending vertically in front of said screen, a shield in said tracks arranged to be raised or lowered, a drawer slidably mounted in the uncovered end of the cabinet, said drawer closing the said end when the former is closed, a reflector mounted in the drawer in line with and facing the uncovered end of the cabinet when the drawer is open, said reflector being positioned at an angle to the vertical, means for adjusting the angle of the reflector, and a stand mounted on the cabinet for holding a picture projector directed towards the reflector, whereby pictures from the projector are directed by the reflector through the cabinet on to the screen, said pictures being clearly distinguishable from outside the cabinet without the necessity of darkening the room in which the stand is located.

6. A picture projector stand comprising an elongated cabinet open at its opposite ends, a translucent screen covering one end, extendable means supporting the other end, a bellows enclosing said extendable means, a longitudinal slot in one side of said bellows, a reflector mounted on said other end in line with and facing said cabinet when said extendable means is extended, and a stand mounted on the cabinet for holding a picture projector directed towards the reflector through said slot, whereby pictures from the projector are directed by the reflector through the cabinet on to the screen, said pictures being clearly distinguishable from outside the cabinet without the necessity of darkening the room in which the stand is located.

7. A picture projector stand comprising an elongated cabinet open at its opposite ends, a translucent screen covering one end, extendable means supporting the other end, a bellows enclosing said extendable means, a longitudinal slot in one side of said bellows, a reflector mounted on said other end in line with and facing said cabinet when said extendable means is extended, said reflector being positioned at an angle to the vertical, means for adjusting the angle of the reflector, and a stand mounted on the cabinet for holding a picture projector directed towards the reflector through said slot, whereby pictures from the projector are directed by the reflector through the cabinet on to the screen, said pictures being clearly distinguishable from outside the cabinet without the necessity of darkening the room in which the stand is located.

8. A picture projector stand comprising an elongated cabinet open at its opposite ends, a translucent screen covering one end, extendable means supporting the other end, a bellows enclosing said extendable means, a longitudinal slot in one side of said bellows, and a reflector mounted on said other end in line with and facing said cabinet when said extendable means is extended, whereby pictures from a projector positioned on top of the cabinet and directed towards the reflector when the extendable means is extended are directed by said reflector through the cabinet on to the screen, said pictures being clearly distinguishable from outside the cabinet without the necessity of darkening the room in which the stand is located.

9. A picture projector stand comprising an elongated cabinet open at its opposite ends, a translucent screen covering one end, a track on each side of said cabinet extending vertically in front of said screen, a shield in said tracks arranged to be raised or lowered, extendable means supporting the other end, a bellows enclosing said extendable means, a longitudinal slot in one side of said bellows, and a reflector mounted on said other end in line with and facing said cabinet when said extendable means is extended, whereby pictures from a projector positioned on top of the cabinet and directed towards the reflector when the extendable means is extended are directed by said reflector through the cabinet on to the screen, said pictures being clearly distinguishable from outside the cabinet without the necessity of darkening the room in which the stand is located.

References Cited in the file of this patent

UNITED STATES PATENTS

| | | |
|---|---|---|
| 1,840,920 | Spaulding | Jan. 12, 1932 |
| 1,951,054 | Kennedy | Mar. 13, 1934 |
| 2,276,392 | Headley | Mar. 17, 1942 |
| 2,396,251 | Colley | Mar. 12, 1946 |
| 2,508,627 | Spiegel | May 23, 1950 |